(12) United States Patent
Melts et al.

(10) Patent No.: US 10,416,887 B1
(45) Date of Patent: Sep. 17, 2019

(54) HYBRID STORAGE DEVICE AND SYSTEM

(71) Applicant: Marvell International Ltd., Hamilton (BM)

(72) Inventors: Dimitry Melts, San Jose, CA (US); Scott Furey, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 107 days.

(21) Appl. No.: 15/598,089

(22) Filed: May 17, 2017

Related U.S. Application Data

(60) Provisional application No. 62/338,323, filed on May 18, 2016, provisional application No. 62/338,346, filed on May 18, 2016, provisional application No. 62/369,548, filed on Aug. 1, 2016.

(51) Int. Cl.
*G06F 12/00* (2006.01)
*G06F 3/06* (2006.01)

(52) U.S. Cl.
CPC .......... *G06F 3/0604* (2013.01); *G06F 3/0629* (2013.01); *G06F 3/0685* (2013.01)

(58) Field of Classification Search
CPC .............................. G06F 3/0604; G06F 3/0629
USPC ........................................................ 711/154
See application file for complete search history.

(56) References Cited

U.S. PATENT DOCUMENTS

| 9,128,847 | B2 | 9/2015 | Ito et al. | |
|---|---|---|---|---|
| 2005/0071560 | A1* | 3/2005 | Bolik | G06F 3/0605 711/117 |
| 2005/0216604 | A1* | 9/2005 | Loffink | G06F 3/0607 710/3 |
| 2010/0115183 | A1 | 5/2010 | Araki et al. | |
| 2011/0179219 | A1* | 7/2011 | Ma | G06F 3/0613 711/103 |
| 2011/0302365 | A1 | 12/2011 | Heo et al. | |
| 2011/0320690 | A1 | 12/2011 | Petersen et al. | |
| 2014/0164675 | A1 | 6/2014 | Ehrlich et al. | |
| 2014/0297909 | A1 | 10/2014 | Aiura et al. | |
| 2015/0113214 | A1 | 4/2015 | Sutardja | |
| 2015/0317091 | A1* | 11/2015 | Hussain | G06F 3/0688 711/103 |
| 2015/0362965 | A1 | 12/2015 | Davis et al. | |
| 2016/0335220 | A1 | 11/2016 | Breakstone et al. | |
| 2017/0357609 | A1 | 12/2017 | Long et al. | |

* cited by examiner

*Primary Examiner* — Jae U Yu

(57) ABSTRACT

A hybrid storage device includes at least a first storage device operating under a first storage interface protocol, at least a second storage device operating under a second storage interface protocol, and a drive controller interface. The drive controller interface has a front-end for connecting to a host via a host interface protocol, a back-end for connecting to the first storage device via the first storage interface protocol, and to the second storage device via the second storage interface protocol, and a respective translation module for translating between the host interface protocol and a respective one of the first and second storage interface protocols. The hybrid storage device may be included in a hybrid storage system with a host processor. The host interface protocol may be the same as one of the first and second storage interface protocols, such as NVMe. The protocols may be implemented in hardware or software.

23 Claims, 9 Drawing Sheets

HYBRID STORAGE DEVICE AND SYSTEM

CROSS REFERENCES TO RELATED APPLICATIONS

This claims the benefit of commonly-assigned U.S. Provisional Patent Applications Nos. 62/338,323 and 62/338,346, each filed May 18, 2016, and United States Provisional Patent Application. No. 62/369,548, filed Aug. 1, 2016, each of which is hereby incorporated by reference herein in its respective entirety.

FIELD OF USE

Implementations of the subject matter of this disclosure generally pertain to a data storage system including storage devices operating under different storage protocols.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

Various different protocols exist for communication between a host processor and a storage device (or the storage controller of a storage device). A protocol may relate to the type of storage device involved. For example, for a hard-disk-type storage device, a host processor may communicate with the hard disk controller using SAS (Serial-Attached SCSI, or Serial-Attached Small Computer System Interface) or SATA (Serial AT Attachment) protocols, while for a solid-state drive (SSD), a host processor may communicate with the SSD controller using the NVMe protocol, also known as the Non-Volatile Memory Host Controller Interface (NVMHCI) Specification, which is particularly adapted for communicating over a PCIe (PCI Express, or Peripheral Component Interconnect Express) bus.

In addition, a host processor may communicate with its associated RAM (random-access memory) using a Direct Memory Access (DMA) protocol, and with the RAM of another host processor with which the host processor is networked using a Remote DMA (RDMA) protocol.

Currently, if a host processor has to communicate with different types of storage devices using different protocols, the different protocols are managed by the host processor itself.

SUMMARY

A hybrid storage device according to implementations of the subject matter of this disclosure includes at least a first storage device operating under a first storage interface protocol, at least a second storage device operating under a second storage interface protocol, and a drive controller interface. The drive controller interface has a front-end for connecting to a host via a host interface protocol, a back-end for connecting to the first storage device via the first storage interface protocol, and to the second storage device via the second storage interface protocol, and a respective translation module for translating between the host interface protocol and a respective one of the first and second storage interface protocols.

In one variant of such a hybrid storage device, the drive controller interface further includes a processor for coordinating among the front-end, the back-end and each respective translation module.

In that variant of such a hybrid storage device, the front-end includes circuitry that implements the host interface protocol.

In that variant of such a hybrid storage device, the back-end includes circuitry that implements at least one of the first and second storage interface protocols.

In that variant of such a hybrid storage device, the processor implements at least one of the first and second storage interface protocols in software.

In another variant of such a hybrid storage device, the host interface protocol is the same as one of the first and second storage interface protocols.

In that variant of such a hybrid storage device, the host interface protocol and the one of the first and second storage interface protocols are NVMe.

In yet another variant of such a hybrid storage device, the first storage device includes a first number of storage devices operating under the first storage interface protocol, and the back-end aggregates the first number of storage devices operating under the first storage interface protocol and presents the first number of storage devices operating under the first storage interface protocol to the front-end as a second number of storage devices operating under the first storage interface protocol, wherein the second number is smaller than the first number.

In still another variant of such a hybrid storage device, the front-end includes a network interface for connecting to at least one host over a network.

In a further variant of such a hybrid storage device, the back-end includes a network interface for connecting to at least one of the first storage device and the second storage device over a network.

A hybrid storage system according to implementations of the subject matter of this disclosure includes a host processor, and hybrid storage device. The hybrid storage device includes at least a first storage device operating under a first storage interface protocol, at least a second storage device operating under a second storage interface protocol, and a drive controller interface having a front-end for connecting to the host processor via a host interface protocol, a back-end for connecting to the first storage device via the first storage interface protocol, and to the second storage device via the second storage interface protocol, and a respective translation module for translating between the host interface protocol and a respective one of the first and second storage interface protocols.

In one variant of such a hybrid storage system, the drive controller interface further includes a processor for coordinating among the front-end, the back-end and each respective translation module.

In that variant of such a hybrid storage system, the front-end includes circuitry that implements the host interface protocol.

In that variant of such a hybrid storage system, the back-end includes circuitry that implements at least one of the first and second storage interface protocols.

In that variant of such a hybrid storage system, the processor implements at least one of the first and second storage interface protocols in software.

In another variant of such a hybrid storage system, the host interface protocol is the same as one of the first and second storage interface protocols.

In yet another variant of such a hybrid storage system, the host interface protocol and the one of the first and second storage interface protocols are NVMe.

In still another variant of such a hybrid storage system, the first storage device includes a first number of storage devices operating under the first storage interface protocol, and the back-end aggregates the first number of storage devices operating under the first storage interface protocol and presents the first number of storage devices operating under the first storage interface protocol to the front-end as a second number of storage devices operating under the first storage interface protocol, wherein the second number is smaller than the first number.

In a further variant of such a hybrid storage system, the front-end includes a network interface for connecting to at least one host over a network.

In yet a further variant of such a hybrid storage device, the back-end includes a network interface for connecting to at least one of the first storage device and the second storage device over a network.

A drive controller interface according to implementations of the subject matter of this disclosure includes a front-end for connecting to a host via a host interface protocol, a back-end for connecting to at least a first storage device via a first storage interface protocol, and to at least a second storage device via a second storage interface protocol, and a respective translation module for translating between the host interface protocol and a respective one of the first and second storage interface protocols.

One variant of such a drive controller interface further includes a processor for coordinating among the front-end, the hack-end and each respective translation module.

In such a variant of a drive controller interface, the front-end includes circuitry that implements the host interface protocol.

In another variant of a drive controller interface, the back-end includes circuitry that implements at least one of the first and second storage interface protocols.

In yet another variant of such a drive controller interface, the processor implements at least one of the first and second storage interface protocols in software.

In another variant of a drive controller interface, the host interface protocol is the same as one of the first and second storage interface protocols.

In that variant of a drive controller interface, the host interface protocol and the one of the first and second storage interface protocols are NVMe.

In yet another variant of a drive controller interface, the front-end includes a network interface for connecting to at least one host over a network.

In still another variant of such a drive controller interface, the back-end includes a network interface for connecting to at least one of the first storage device and the second storage device over a network.

BRIEF DESCRIPTION OF THE DRAWINGS

Features of the subject matter of the disclosure, its nature and various advantages, will be apparent upon consideration of the following detailed description, taken in conjunction with the accompanying drawings, in which like reference characters refer to like parts throughout, and in which.

DETAILED DESCRIPTION

According to implementations of the subject matter of this disclosure, a drive controller interface appears to a host processor as an interface operating under a single protocol, but interfaces with storage devices operating under multiple different protocols. This frees the processor from being required to deal with more than one storage protocol.

According to one example of an implementation of the subject matter of this disclosure, a drive controller interface appears to a host processor as an interface operating under the aforementioned NVMe protocol, but interfaces with storage devices operating under various protocols, possibly including, but not necessarily limited to, NVMe, SAS, SATA and RDMA. The interface according to this implementation provides the necessary protocol translations.

According to a further variant of implementations of the subject matter of this disclosure, a drive controller interface supports "NVMe over fabrics," so that a host processor can access storage devices operating under different protocols, and located remotely from the host (i.e., on a network, such as within a data center). As far as the host is concerned, the host is interfacing with a local storage device under one protocol (e.g., NVMe).

Figure 1:
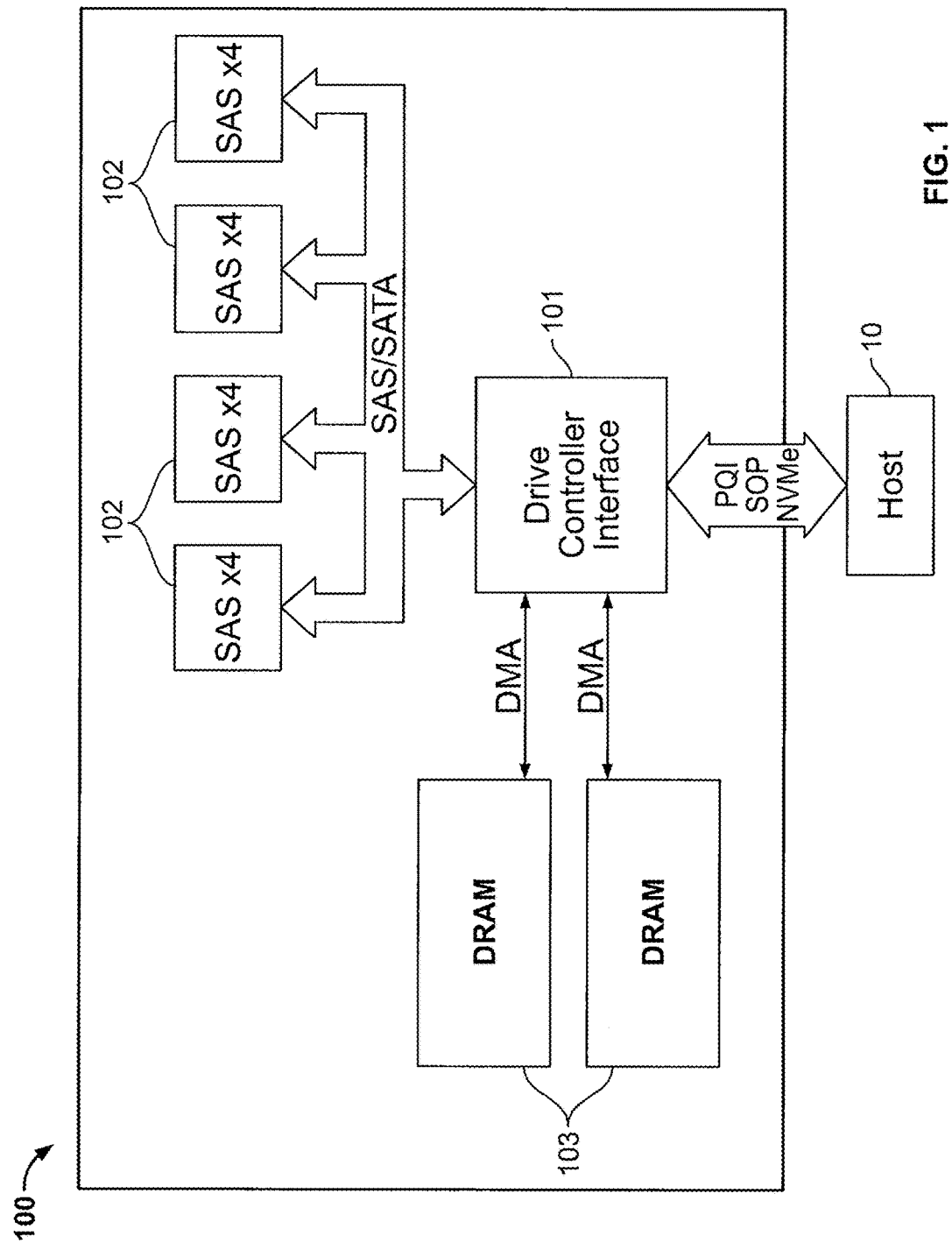
FIG. 1 shows a first configuration of a hybrid storage system according to an implementation of the subject matter of this disclosure.

Various configurations are possible with a drive controller interface according to implementations of the subject matter of this disclosure. For example, FIG. 1 shows a drive controller interface 101 according to an implementation 100 of the subject matter of this disclosure, interfacing between a host processor 10 and a group (in this case four) of SAS (or SATA) 4 Gb/s storage devices 102. Drive controller interface 101 virtualizes SAS/SATA devices 102, so that host processor 10 sees a 12 Gb/s intelligent PCIe-compliant storage device, under a PCIe storage protocol—e.g., NVMe, POI (PCIe Queuing Interface) or SOP (SCSI Over PCIe). Hardware RAID functionality and erasure coding also may be provided. In addition, DRAM 103 may be provided for low-latency write-data caching.

Figure 2:
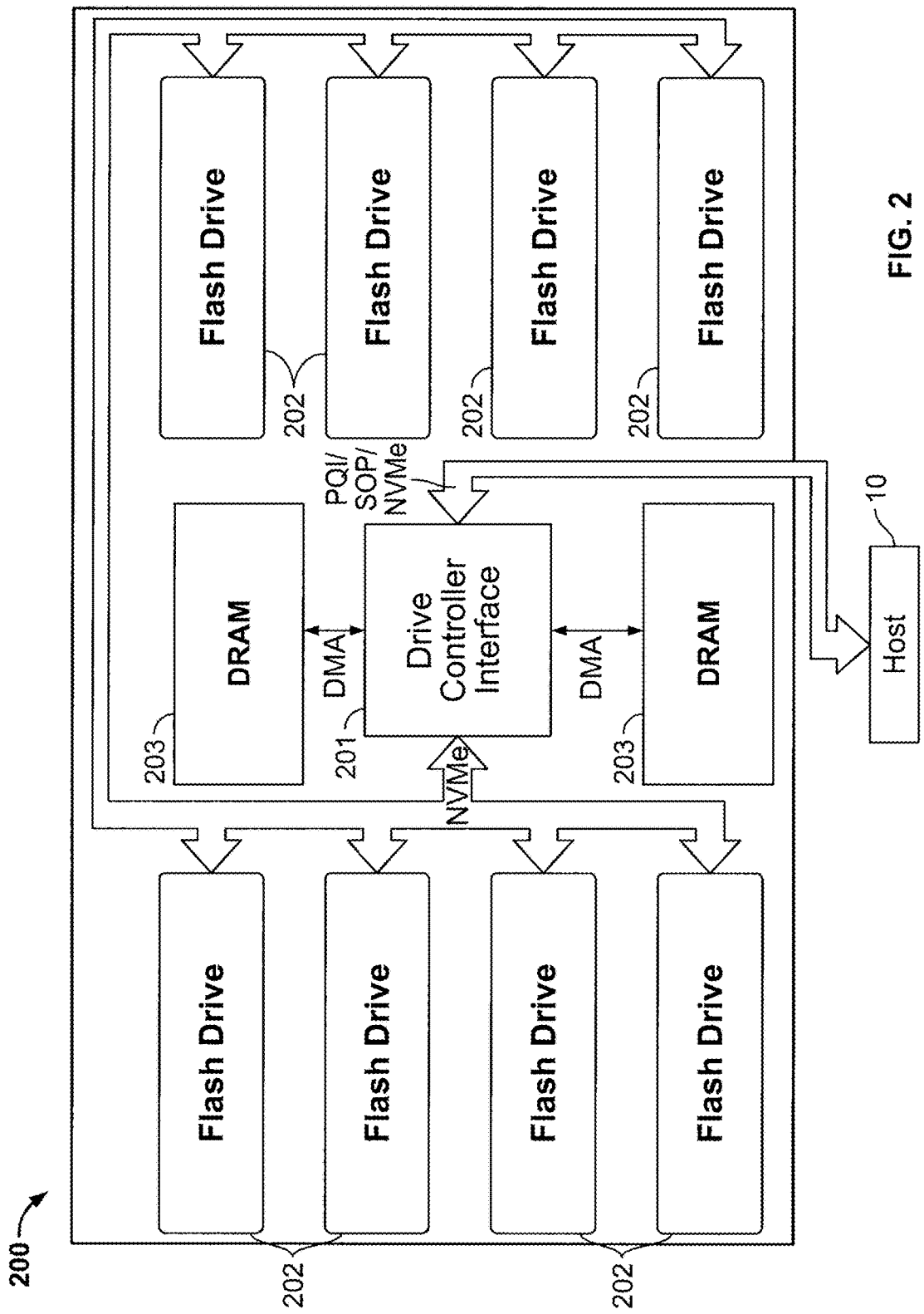
FIG. 2 shows a second configuration of a hybrid storage system according to an implementation of the subject matter of this disclosure.

In another configuration of a drive controller interface 201 according to an implementation 200 of the subject matter of this disclosure, shown in FIG. 2, a large number (e.g., eight) of NVMe devices 202 (e.g., Flash drives) can be virtualized by drive controller interface 201 to a single NVMe device. This aggregation of the various b devices 202 is transparent to host processor 10 and reduces storage I/O latency. Performance of 2-3MIOPS may be achieved. Moreover, drive controller interface 201 allows consumer-grade devices (e.g., Flash memory cards in the M.2 form factor) to be used as NVMe devices 202, if smart management, such as second-level Flash. Translation. Layer (FTL), is used.

In addition, DRAM 203 may be provided, allowing write operations to be gathered and reordered before being staged to the Flash devices 202. This prunes overwrites and reduces the effective number of writes. In turn, the lower number of write cycles would decrease garbage collection and thereby improve read performance.

Figure 3:
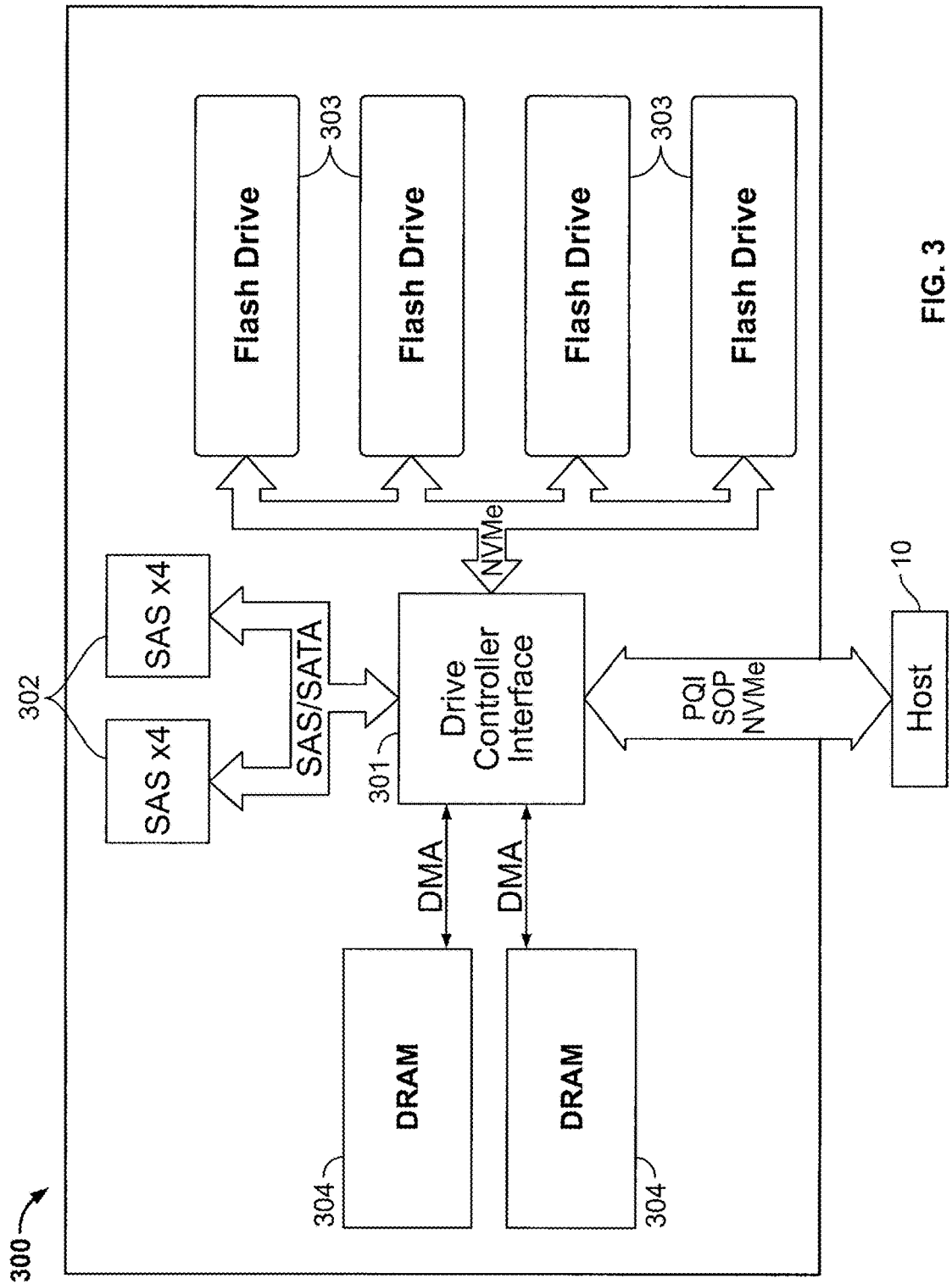
FIG. 3 shows a third configuration of a hybrid storage system according to an implementation of the subject matter of this disclosure.

Another configuration of a drive controller interface 301 according to an implementation 300 of the subject matter of this disclosure, shown in FIG. 3, may be considered a hybrid of implementation 100 and implementation 200 in that drive controller interface 301 interfaces between a host processor 10 and a group (in this case two) of SAS (or SATA) 4 Gb/s storage devices 302 as well a group (in this case four) of NVMe devices 303 (e.g., Flash drives), all of which can be virtualized by drive controller interface 301 to a single NVMe device. RAID and aggregation functions, as well as DRAM 304, as described in connection with the previous implementations, may be provided in this implementation 300.

Figure 4:
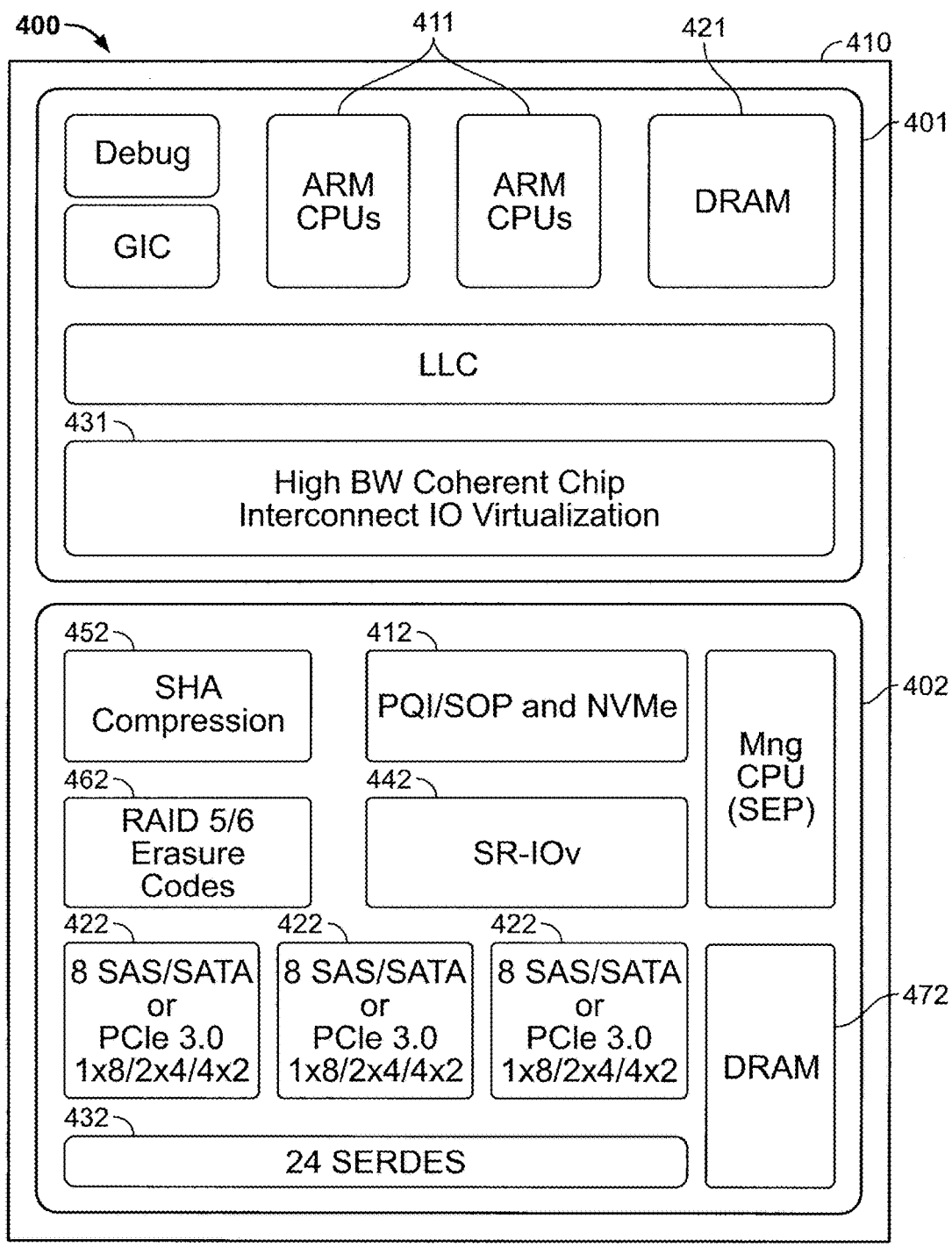
FIG. 4 shows an implementation of a drive controller interface in accordance with the subject matter of this disclosure.

Drive controller interface 101/201/301 may have the structure 400 shown in FIG. 4. Drive controller interface 400 includes a "northbridge" chip 401 and a "southbridge" chip 402 on separate dies in a single package 410.

Northbridge chip 401 includes one or more processor cores 411, which may be ARM®-compliant processor cores such as those available from ARM Ltd., of Cambridge, England, or its subsidiaries. Northbridge chip 401 also includes DRAM 421 for use by processor cores 411, as well as other functional blocks that may be necessary for operation of processor cores 411, such as interconnect circuitry 431 for connecting to other devices (including southbridge chip 402). While northbridge chip 401 may have any architecture, in one implementation, the various functional modules of northbridge chip 401, as well as those of southbridge chip 402 described below, may be assembled using the modular chip architecture described in commonly-assigned United States Patent Application Publication 2015/0169495, which is hereby incorporated by reference herein in its entirety.

Southbridge chip 402 includes the hardware accelerators and various device interfaces used to connect to the various forms of storage as discussed above. Components of southbridge chip 402 may include PCIe/SoP/NVMe hardware accelerator 412, as well as a combination of SAS/SATA and NVMe interfaces 422. The breakdown of interfaces 422 between SAS/SATA and NVMe will depend on the number of storage devices of each type. In the example shown, all of the interfaces 422 are SAS/SATA interfaces. Southbridge chip 402 also includes serial interface 432 with sufficient "lanes" to accommodate the number of channels or devices supported by interfaces 422. Thus, in the example shown, interface 432 includes 24 lanes because each of the three interfaces 422, in the example shown, accommodates eight lanes. In addition, to facilitate PCIe connectivity, there may be a single root input/output virtualization (SR-IOv) module 442.

Southbridge chip 402 may further include a compression module 452 implementing, e.g., Secure Hash Algorithm (SHA) compression, as well as a module 462 for RAID functionality and erasure codes, and DRAM 472 serving as working memory for the functions on southbridge chip 402.

Regardless of the particular architecture of drive controller interface 101/201/301, in accordance with implementations of the subject matter of this disclosure, drive controller interface 101/201/301 performs the functions of interfacing to a host processor and to NVMe storage devices via NVMe, interfacing to non-NVMe storage devices in their native protocols, and translating between each of those native protocols and NVMe. In the particular architecture 400 described above in connection with FIG. 4, the interface to the host processor via NVMe is performed in hardware using one or more hardware accelerators provided for that purpose, as is the interface to non-NVMe storage devices in their native protocols. The interface to NVMe storage devices is performed in software, as is the translation between the protocols of the non-NVMe storage devices, in accordance with the relevant standards.

Although architecture 400 is depicted in FIG. 4 as including a particular number of processor cores and particular numbers and types of other modules, the subject matter of this disclosure is not limited to any particular number of processor cores or any particular number or type of other modules.

In some implementations of the subject matter of this disclosure, at least some of the storage devices may be located remotely from the drive controller interface, such as on a network within a data center. Such an arrangement may rely on the "NVMe over Fabrics" (NVoF) specification, and is transparent to both the host and the storage devices. No changes are required to the storage devices, as long as they can communicate using NVMe, whether natively or via a controller interface such as that described above. Similarly, no changes are required to any software at the host.

Figure 5:
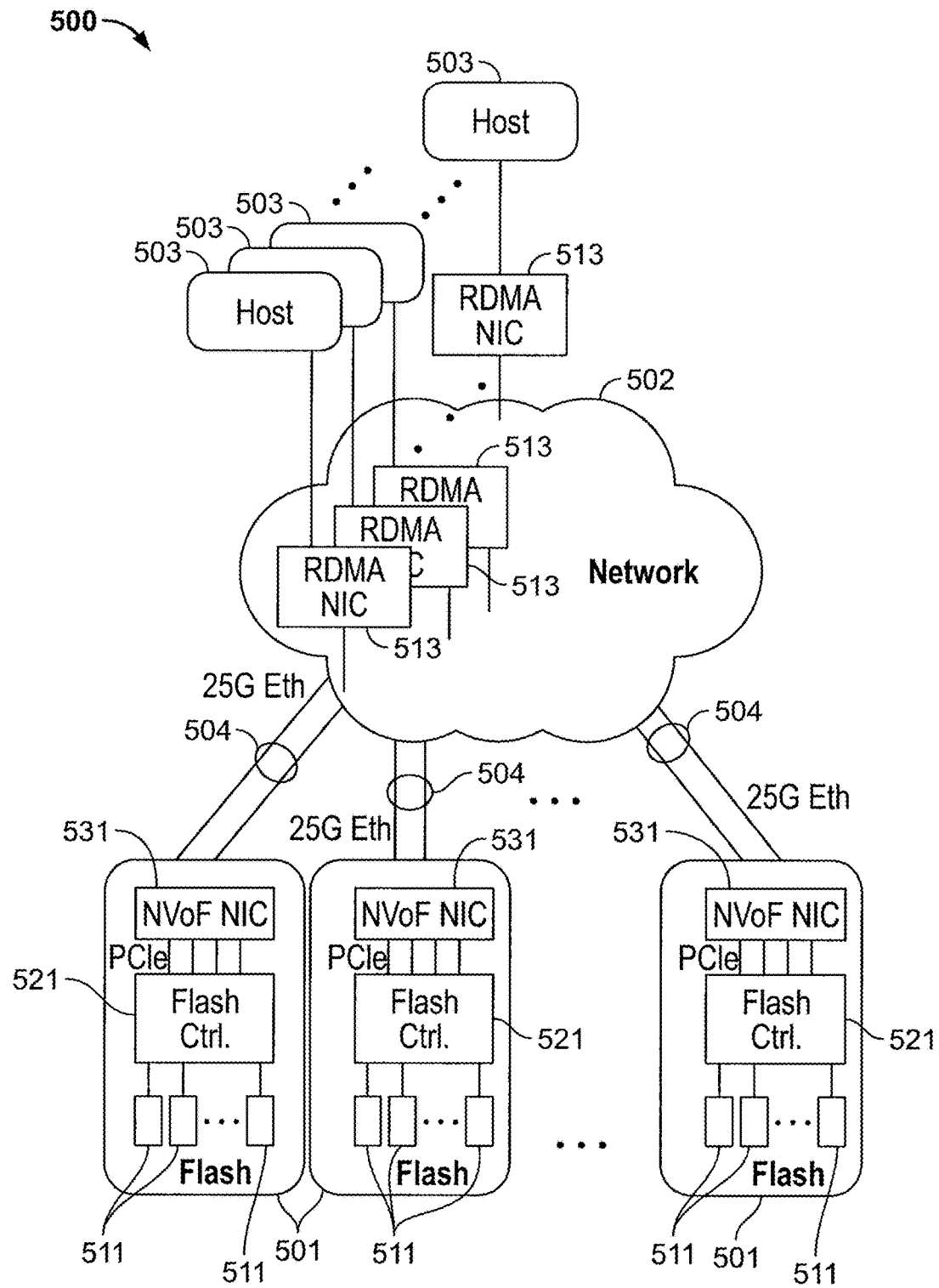
FIG. 5 shows a fourth configuration of a hybrid storage system according to an implementation of the subject matter of this disclosure.

One such implementation 500 is shown in FIG. 5. As seen, a plurality of storage units 501, each including one or more storage devices 511 and a drive controller interface 521 similar to drive controller interface 101/201/301 described above, is connected via an NVMe-over-Fabrics-enabled network interface card (NVoF NIC) 531 to network 502 using, in this example, 25 Gb/s Ethernet connections 504. Each of a plurality of host devices 503 is connected to network 502 via a respective EDMA-enabled network interface card (rNIC) 513.

rNIC 513 presents an NVMe front-end to its respective host 503 and an RDMA back-end to network 502. Similarly, NVoF NIC 531 presents an RDMA front-end to network 502 and an NVMe back-end to drive controller interface 521. The RDMA connections to network 502 may rely on the RDMA over Converged Ethernet (RoCEv2) standard.

Figure 6:
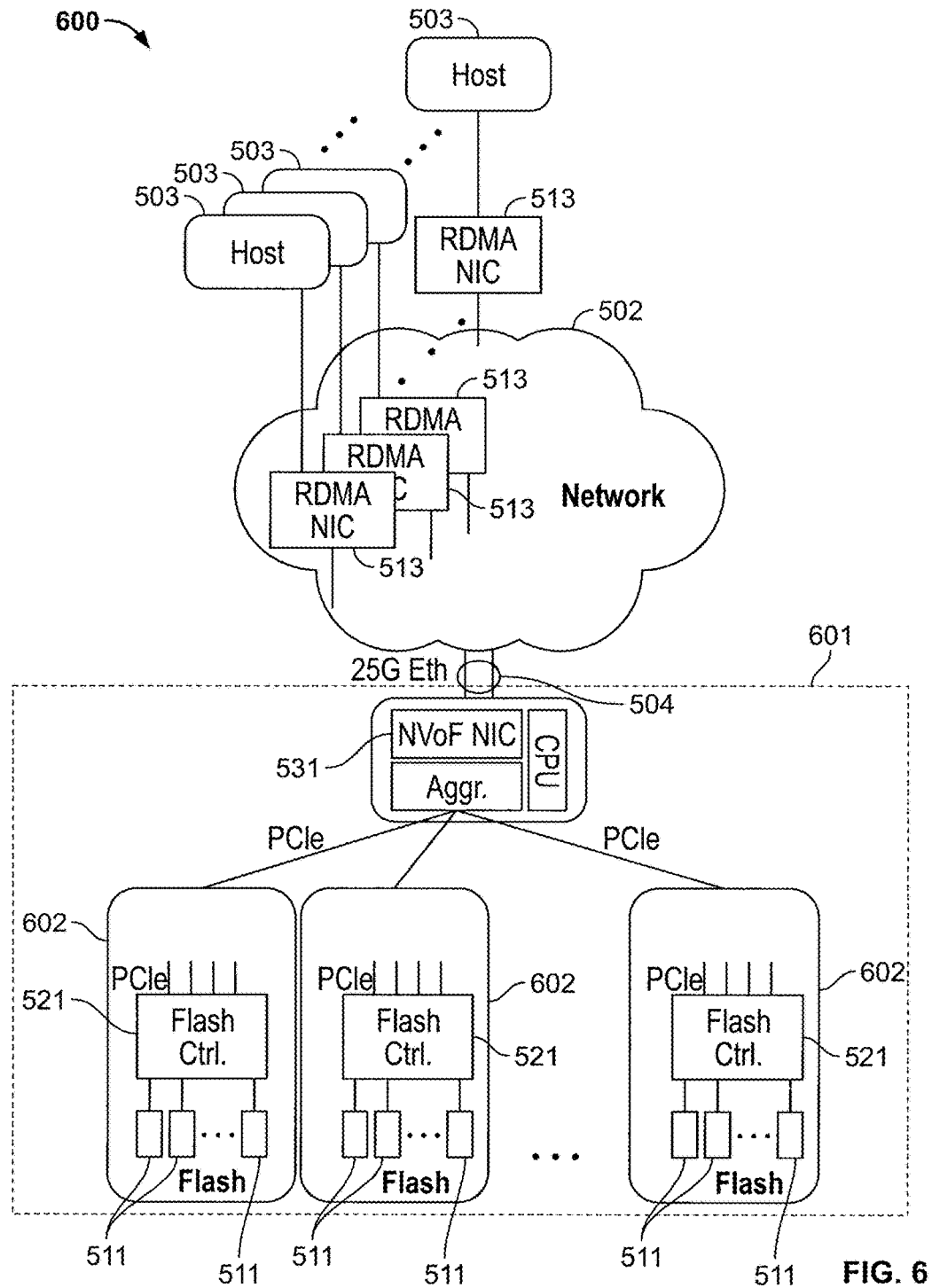
FIG. 6 shows a fifth configuration of a hybrid storage system according to an implementation of the subject matter of this disclosure.

In another implementation 600 as shown in FIG. 6, an aggregated storage device 601, similar to aggregated storage device 200 as shown in FIG. 2, may be equipped with an NVoF NIC 531, thereby connecting multiple storage devices 602 to network 502. Each host 503 views storage devices 602 as a single aggregated storage device over network 502.

Figure 7:
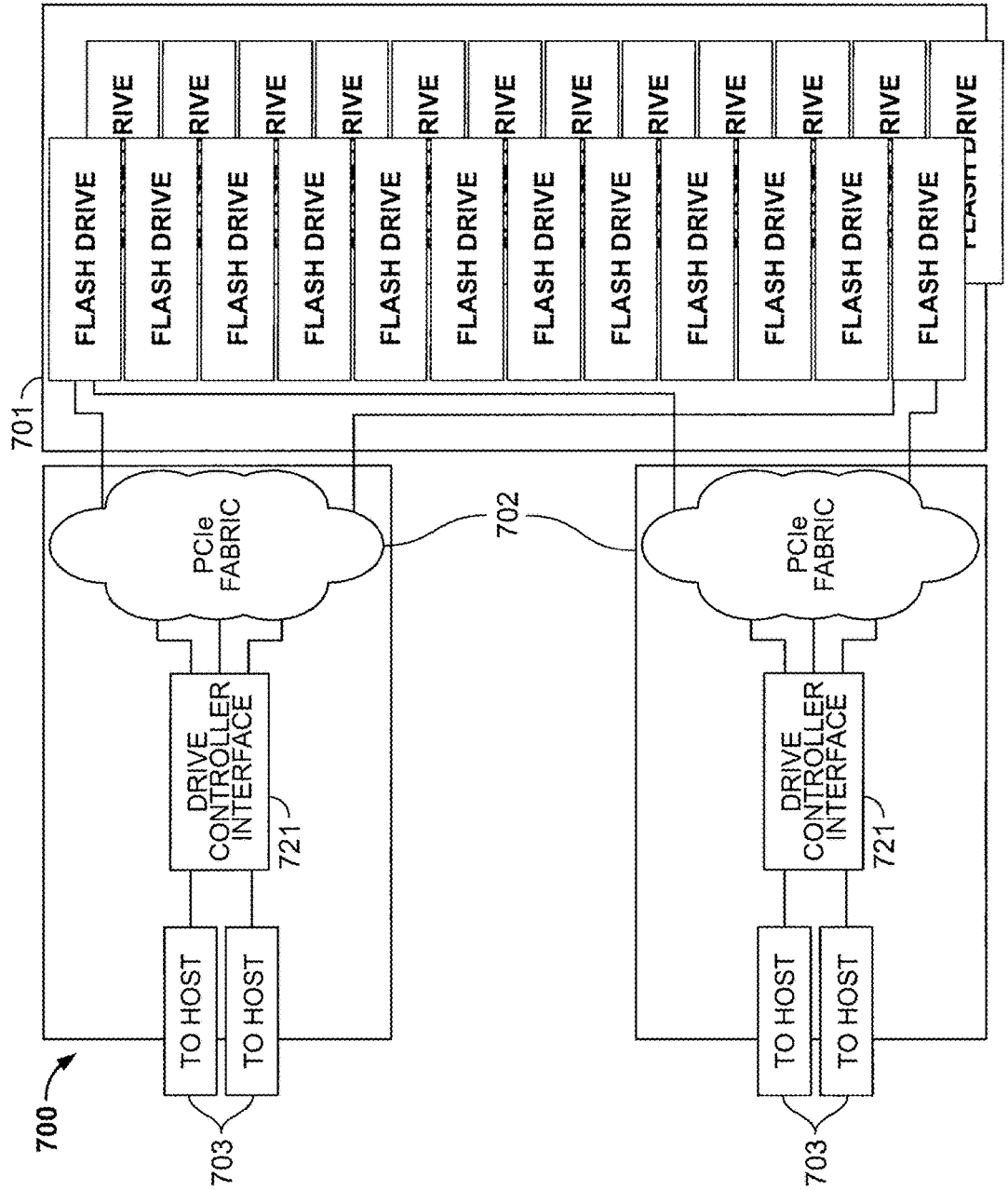
FIG. 7 shows a first configuration of an aggregated hybrid storage device according to an implementation of the subject matter of this disclosure.

While in implementations 500 and 600, each storage device 502, 602 includes a drive controller interface 521 connected to multiple storage media as shown in FIGS. 1-3, with drive controller interface 521 connected via network 502 to hosts 503, in another implementation 700 shown in FIG. 7, which may be referred to as a "storage fabric," the back-end of a drive controller interface 721 (similar to interface 521) is connected to storage media 701 via a PCIe/NVMe fabric 702. In this implementation, drive controller interface 721 and each of storage devices 701 includes a network interface card (not shown) similar to NVoF NIC 531, for connection to fabric 702. The front-end of drive controller interface 721 can be connected, as at 703, directly to an individual host 503, or to an NVMe fabric connecting drive controller interface 721 to multiple hosts 503.

Figure 8:
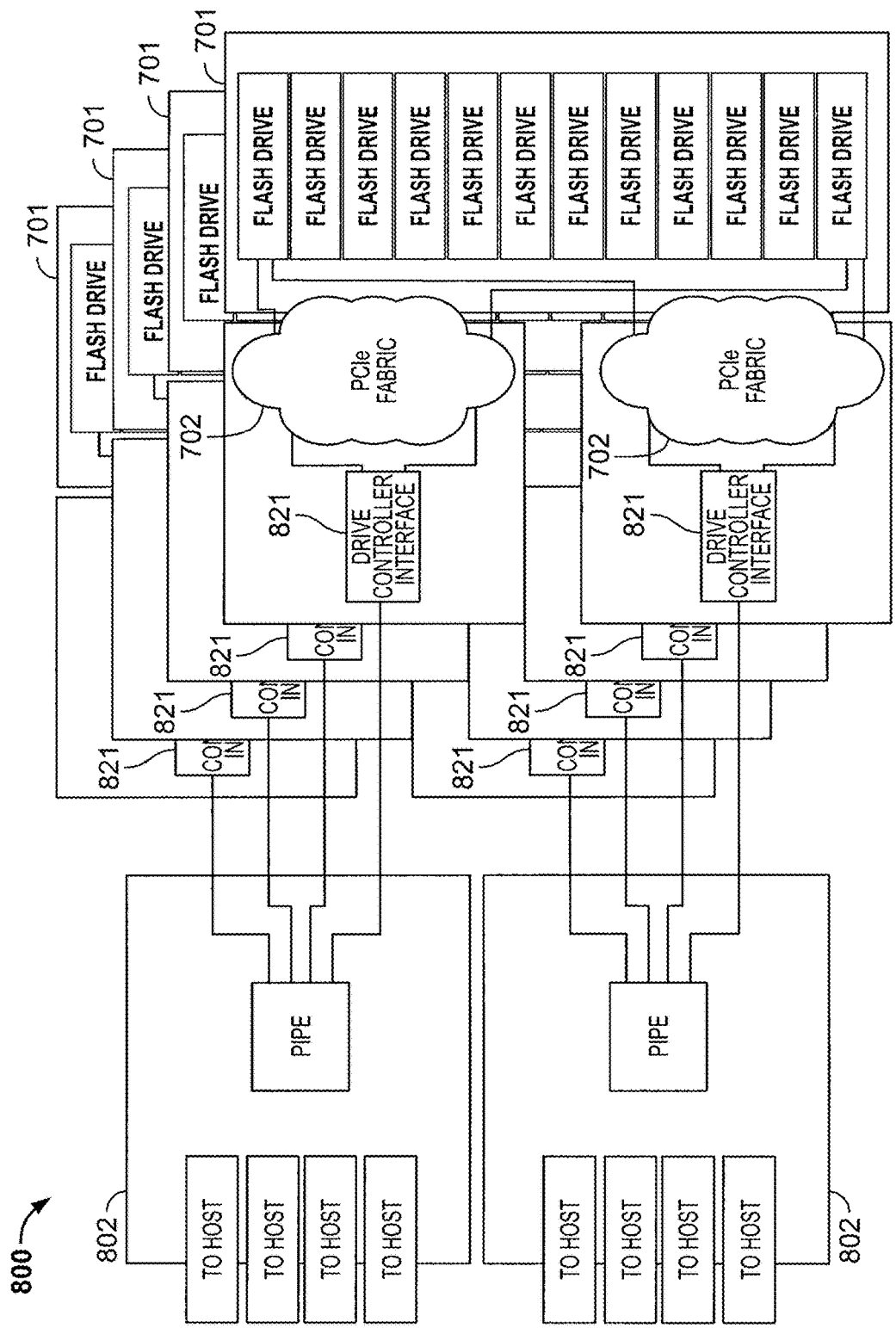
FIG. 8 shows a second configuration of an aggregated hybrid storage device according to an implementation of the subject matter of this disclosure.

Other variations are possible. For example, FIG. 8 shows an implementation 800 in which the back-end of an individual drive controller interface 821, similar to drive controller interface 101/201/301/721, is connected to a plurality of storage fabrics 702. The front-end of drive controller interface 821 can be connected directly (not shown) to an individual host 503, or to an NVMe fabric 802 that connects drive controller interface 821 to multiple hosts 503.

Figure 9:
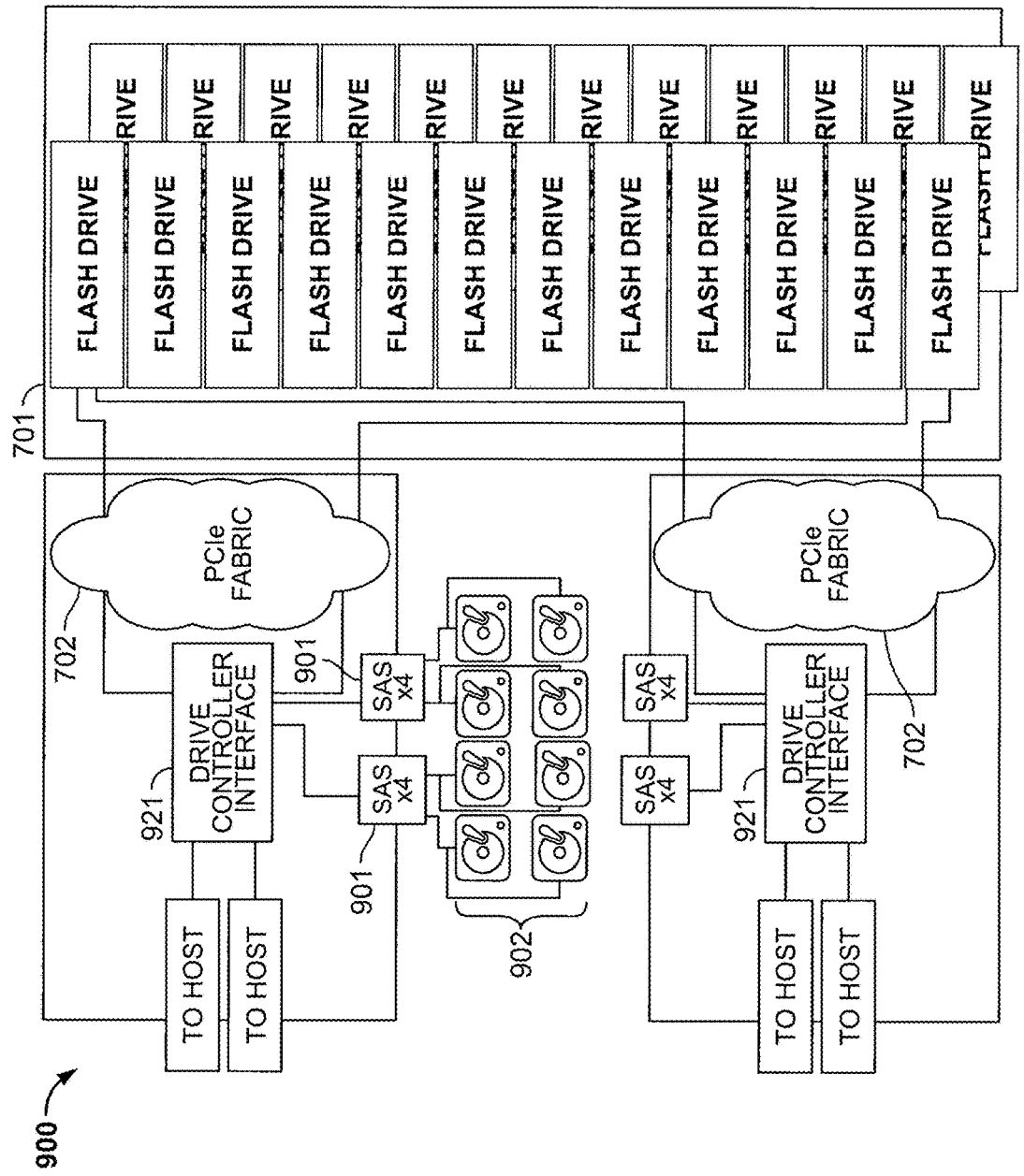
FIG. 9 shows a third configuration of an aggregated hybrid storage device according to an implementation of the subject matter of this disclosure.

In implementation 900 shown in FIG. 9, the back-end of each drive controller interface 921, similar to drive controller interface 101/201/301/721/821, connects not only to one or more storage fabrics 702, but also to other types of storage, such as SAS/SATA drives 902, via interfaces 901. The front-end of drive controller interface 921 can be connected directly to an individual host 503, or to an NVMe fabric connecting drive controller interface 821 to multiple hosts 503.

Thus it seen that a drive controller interface that appears to a host processor as an interface operating under a single protocol, but which interfaces with storage devices operating under multiple different protocols, has been provided. Implementations of the subject matter of this disclosure may be used to allow a host processor to communicate transparently, using a single protocol, with different types of storage devices having different native protocols.

As used herein and in the claims which follow, the construction "one of A and B" shall mean "A or B."

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A hybrid storage device, comprising:
   at least a first storage device operating under a first storage interface protocol;
   at least a second storage device operating under a second storage interface protocol different from the first storage interface protocol; and
   a drive controller interface having:
   a front-end for connecting to a host via a host interface protocol different from the first storage interface protocol and the second storage interface protocol,
   a back-end for connecting to the first storage device via the first storage interface protocol, and to the second storage device via the second storage interface protocol, and
   a respective translation module for translating between the host interface protocol and a respective one of the first and second storage interface protocols.

2. The hybrid storage device of claim 1 wherein the drive controller interface further comprises a processor for coordinating among the front-end, the back-end and each respective translation module.

3. The hybrid storage device of claim 2 wherein the front-end includes circuitry that implements the host interface protocol.

4. The hybrid storage device of claim 2 wherein the back-end includes circuitry that implements at least one of the first and second storage interface protocols.

5. The hybrid storage device of claim 2 wherein the processor implements at least one of the first and second storage interface protocols in software.

6. The hybrid storage device of claim 1 wherein:
   the first storage device comprises a first number of storage devices operating under the first storage interface protocol; and
   the back-end aggregates the first number of storage devices operating under the first storage interface protocol and presents the first number of storage devices operating under the first storage interface protocol to the front-end as a second number of storage devices operating under the first storage interface protocol, wherein the second number is smaller than the first number.

7. The hybrid storage device of claim 1 wherein the front-end includes a network interface for connecting to at least one host over a network.

8. The hybrid storage device of claim 1 wherein the back-end includes a network interface for connecting to at least one of the first storage device and the second storage device over a network.

9. A hybrid storage system, comprising:
   a host processor; and
   a hybrid storage device; wherein:
   the hybrid storage device comprises:
   at least a first storage device operating under a first storage interface protocol;
   at least a second storage device operating under a second storage interface protocol different from the first storage interface protocol; and
   a drive controller interface having:
   a front-end for connecting to the host processor via a host interface protocol different from the first storage interface protocol and the second storage interface protocol,
   a back-end for connecting to the first storage device via the first storage interface protocol, and to the second storage device via the second storage interface protocol, and
   a respective translation module for translating between the host interface protocol and a respective one of the first and second storage interface protocols.

10. The hybrid storage system of claim 9 wherein the drive controller interface further comprises a processor for coordinating among the front-end, the back-end and each respective translation module.

11. The hybrid storage system of claim 10 wherein the front-end includes circuitry that implements the host interface protocol.

12. The hybrid storage system of claim 10 wherein the back-end includes circuitry that implements at least one of the first and second storage interface protocols.

13. The hybrid storage system of claim 10 wherein the processor implements at least one of the first and second storage interface protocols in software.

14. The hybrid storage system of claim 9 wherein:
   the first storage device comprises a first number of storage devices operating under the first storage interface protocol; and
   the back-end aggregates the first number of storage devices operating under the first storage interface protocol and presents the first number of storage devices operating under the first storage interface protocol to the front-end as a second number of storage devices operating under the first storage interface protocol, wherein the second number is smaller than the first number.

15. The hybrid storage system of claim 9 wherein the front-end includes a network interface for connecting to at least one host over a network.

16. The hybrid storage device of claim 9 wherein the back-end includes a network interface for connecting to at least one of the first storage device and the second storage device over a network.

17. A drive controller interface comprising:
- a front-end for connecting to a host via a host interface protocol;
- a back-end for connecting to at least a first storage device via a first storage interface protocol, and to at least a second storage device via a second storage interface protocol different from the first storage interface protocol, the host interface protocol being different from the first storage interface protocol and the second storage interface protocol; and
- a respective translation module for translating between the host interface protocol and a respective one of the first and second storage interface protocols.

18. The drive controller interface of claim 17 further comprising a processor for coordinating among the front-end, the back-end and each respective translation module.

19. The drive controller interface of claim 18 wherein the front-end includes circuitry that implements the host interface protocol.

20. The drive controller interface of claim 18 wherein the back-end includes circuitry that implements at least one of the first and second storage interface protocols.

21. The drive controller interface of claim 18 wherein the processor implements at least one of the first and second storage interface protocols in software.

22. The drive controller interface of claim 17 wherein the front-end includes a network interface for connecting to at least one host over a network.

23. The drive controller interface of claim 17 wherein the back-end includes a network interface for connecting to at least one of the first storage device and the second storage device over a network.

\* \* \* \* \*